United States Patent
Blundell et al.

(10) Patent No.: US 8,255,626 B2
(45) Date of Patent: Aug. 28, 2012

(54) ATOMIC COMMIT PREDICATED ON CONSISTENCY OF WATCHES

(75) Inventors: Colin B. Blundell, West Allenhurst, NJ (US); Harold W. Cain, III, Hartsdale, NY (US); Gheorghe C. Cascaval, Carmel, NY (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/633,906

(22) Filed: Dec. 9, 2009

(65) Prior Publication Data
US 2011/0138126 A1  Jun. 9, 2011

(51) Int. Cl.
*G06F 12/00*  (2006.01)
(52) U.S. Cl. ........................... 711/117; 711/154
(58) Field of Classification Search ................ 711/117, 711/154
See application file for complete search history.

(56) References Cited

U.S. PATENT DOCUMENTS

| | | | |
|---|---|---|---|
| 6,349,361 B1 * | 2/2002 | Altman et al. ................. | 711/121 |
| 7,206,903 B1 | 4/2007 | Moir et al. | |
| 7,376,800 B1 | 5/2008 | Choquette et al. | |
| 2004/0162968 A1 | 8/2004 | Tremblay et al. | |
| 2005/0015637 A1 * | 1/2005 | Van Eijndhoven et al. ... | 713/400 |
| 2005/0177831 A1 | 8/2005 | Goodman et al. | |
| 2006/0085588 A1 | 4/2006 | Rajwar et al. | |
| 2006/0294326 A1 | 12/2006 | Jacobson et al. | |
| 2008/0040551 A1 | 2/2008 | Gray et al. | |
| 2008/0082756 A1 * | 4/2008 | Shen ............................ | 711/141 |
| 2009/0235254 A1 | 9/2009 | Michael | |

OTHER PUBLICATIONS

Bobba, Jayaram et al., "Performance Pathologies in Hardware Transactional Memory", ACM, ISCA '07, Jun. 9-13, 2007, 11 pages.
Herlihy, Maurice et al., "Transactional Memory: Architectural Support for Lock-Free Data Structures", Proceedings of the 20th Annual International Symposium on Computer Architecture, May 1993, pp. 289-300.
Saha, Bratin et al., "Architectural Support for Software Transactional Memory", 39th Annual IEEE/ACM International Symposium on Microarchitecture (Micro'06), 12 pages.

* cited by examiner

*Primary Examiner* — Hashem Farrokh
(74) *Attorney, Agent, or Firm* — Stephen J. Walder, Jr.; Brian Verminski

(57) ABSTRACT

Mechanisms for performing predicated atomic commits based on consistency of watches is provided. These mechanisms include executing, by a thread executing on a processor of the data processing system, an atomic release instruction. A determination is made as to whether a speculative store has been lost, due to an eviction of a memory block to which the speculative store is performed, since a previous atomic release instruction was processed. In response to the speculative store having been lost, invalidating, by the processor, speculative stores that have been performed since the previous atomic release instruction was processed. In addition, the method comprises, in response to the speculative store not having been lost, committing, by the processor, speculative stores that have been performed since the previous atomic release instruction was processed.

20 Claims, 6 Drawing Sheets

```
STEM_END:

if FAST_STM_END()
            return
    lock metadata for writes
    if ! Wchkall
            check read set for conflicts
    do writes
    increment and release metadata for writes FAST_STM_END:// returns success or failure for entry in write set do
            increment metadata speculatively(entry)
            do write speculatively(entry)
    ret = atomic_release
    return ret
```

*FIG. 7*

ATOMIC COMMIT PREDICATED ON CONSISTENCY OF WATCHES

BACKGROUND

The present application relates generally to an improved data processing apparatus and method and more specifically to mechanisms for providing an atomic commit operation predicated on the consistency of watches.

An atomic operation is a set of two or more operations that can be combined so that they appear to the data processing system in which they are performed to be a single operation with only two possible outcomes: success or failure. With an atomic operation, operations in other sets of operations do not know about any changes being made by the operations within the set of operations that comprise the atomic operation until the entire set of operations completes. Moreover, with an atomic operation, if any of the operations within the set of operations fails, the entire set of operations fails and the state of the system is restored to the state it was in before any of the operations within the set of operations began executing.

An atomic commit is an operation which a set of distinct changes is applied as a single operation. If all the changes are applied, the atomic commit is said to have succeeded. If there is a failure before the atomic commit can be completed, the "commit" is aborted and all changes that have taken place are reversed or rolled back. In either case, the atomic commit leaves the system in a consistent state. Atomic commits are often used in database systems when committing multiple sets of changes at once. Atomic commits are employed by revision control systems whereby atomic commits are used to control uploading of changes of multiple files to a source of the files while guaranteeing that all files get fully uploaded and merged. Atomic commits are also employed by numerous transactional processing systems (ATMs, online purchasing, etc.) in which operations on different systems (e.g., order placement, credit card transaction, inventory update) are combined in a single set that succeeds or fails as a group.

Atomic commits are also useful in the areas of transactional memory and speculative multi-threading, also known as thread-level speculation. Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur. With atomic transactions, the instructions of the transaction appear to occur all at once between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library. Software transactional memory can be combined with hardware support to design a hybrid transactional memory system.

The concept of transactional memory was introduced by Herlihy and Moss "Transactional Memory: Architectural Support for Lock-Free Data Structures," Proceedings of the 20th Annual International Symposium on Computer Architecture, pp. 289-300, May 1993. However, as described in Bobba et al., "Performance Pathologies in Hardware Transactional Memory," ISCA '07, Jun. 9-13, 2007, a programmer can invoke a transaction in a multi-threaded application and rely on the transactional memory system to make its execution appear atomic in a global serial order. Bobba et. al discusses conflict resolution policies in transactional memory systems.

Transactional memory systems seek high performance by speculatively executing transactions concurrently and only committing transactions that are non-conflicting. A conflict occurs when two or more concurrent transactions access the same data element, e.g. a word, block, object, etc., and at least one access is a write. Transactional memory systems may resolve some conflicts by stalling one or more transactions.

Speculative multi-threading (SMT) is a type of speculative execution that occurs at a thread level as opposed to an instruction level. SMT is a dynamic parallelization technique that uses out-of-order execution of instructions of multiple threads to achieve an increase is operational speed of processors. With SMT, the changes performed by threads may be committed atomically if there are no dependency violations between threads. Dedicated hardware keeps track of speculative thread read (load) and write (store) data locations and aborts, i.e. rolls back or squashes, threads that are shown to have violated an actual data dependency.

Architectural support for atomically committing a set of stores is useful in mechanisms that employ coarse-grained speculation, such as transactional memory and thread level speculation or speculative multi-threading. However, such atomic support is complicated by two factors. First, it is challenging for hardware to support atomic commit of an unbounded number of stores. Second, in many contexts, this atomic commit needs to be predicated on whether there have been external writes (writes outside the set of instructions comprising the atomic block) to a, possibly different, set of blocks.

SUMMARY

In one illustrative embodiment, a method is provided for performing a predicated atomic commit of stores to a memory of the data processing system. The method may be implemented by a processor of a data processing system. The method comprises executing, by a thread executing on the processor, an atomic release instruction. The method further comprises determining if a speculative store has been lost, due to an eviction of a memory block to which the speculative store is performed, since a previous atomic release instruction was processed. Moreover, the method comprises, in response to the speculative store having been lost, invalidating speculative stores that have been performed since the previous atomic release instruction was processed. In addition, the method comprises, in response to the speculative store not having been lost, committing speculative stores that have been performed since the previous atomic release instruction was processed.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an example algorithm for implementing the mechanisms of the illustrative embodiments in a software transactional memory (STM) in accordance with one illustrative embodiment.

DETAILED DESCRIPTION

Figure 1:
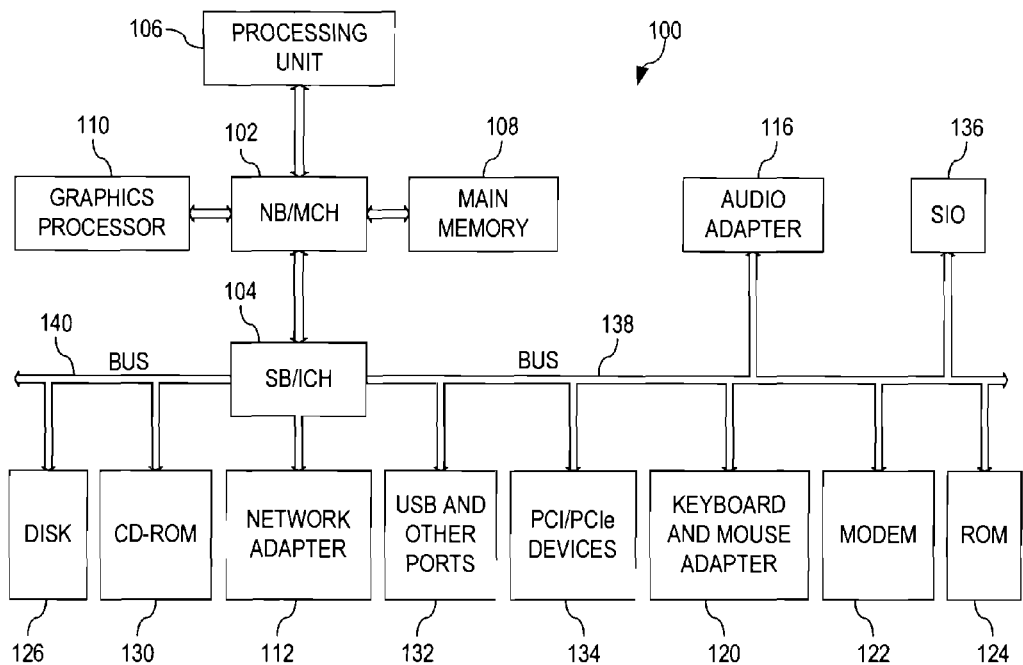
FIG. 1 is an example block diagram of a data processing system in which example mechanisms of the illustrative embodiments may be implemented.

The illustrative embodiments provide a mechanism for providing an atomic commit operation predicated on consistency of watches. A processor is provided that implements the mechanisms of the illustrative embodiments to perform a best-effort atomic commit predicated on whether the processor has retained permissions to a possibly different set of memory blocks. The mechanisms of the illustrative embodiments perform a series of speculative stores and, optionally, set watches on a set of memory blocks. The mechanisms of the illustrative embodiments then execute an atomic release instruction, which attempts to atomically release the stores. The atomic release instruction fails if any of the speculative stores have been lost, i.e. a cache line that stores the speculative data is evicted from the cache, or any of the watches set by the current thread on memory blocks have been lost, i.e. one or more watched memory blocks were written by a different thread. In such a case, the mechanisms of the illustrative embodiments do not perform any of the speculative stores but rather return an error code indicating failure to the application process.

In this manner, the illustrative embodiments provide a rich interface to accelerate mechanisms for coarse-grained speculation without requiring the processor architecture to support predicated atomic commit of an unbounded set of stores. For example, one usage of this mechanism is in accelerating software transactional memory. Software transactional memory algorithms typically have to acquire a set of locks to commit all writes for a transaction atomically. The mechanisms of the illustrative embodiments allow the transactional memory algorithms to avoid acquiring locks in common cases.

The mechanisms of the illustrative embodiments add two new instructions to the processor's instruction set architecture (ISA), a speculative store instruction and an atomic release instruction. The semantics of the speculative store instruction is that it is not performed until the time that the processor encounters an atomic release instruction. The semantics of the atomic release instruction is that the atomic release instruction attempts to atomically perform all speculative stores since the previous atomic release instruction. The atomic release instruction returns a result indicating success or failure to the application process or software that is performing the speculative store operations. The atomic instruction fails if any of the speculative stores have been lost or if any watched blocks have been lost. On a failure, the processor discards all speculative stores and the transaction is aborted. The software submitting the transaction may handle such an abort of the transaction in many different ways. For example, the software may retry the transaction or abandon it. Upon success, the speculative stores are made permanent by releasing the speculative values to be visible by other threads executing in association with the cache.

In one illustrative embodiment, speculative stores are written directly to the L2 cache of the processor. However, prior to writing the speculative store to the L2 cache, a prior value in the L2 cache, which is part of a block that is marked as dirty and being replaced by the speculative store, is written back to system memory. The L2 cache lines are extended to include one or more speculative bits for tracking a speculative state of the L2 cache lines, e.g., the L2 cache may be implemented as a speculative versioning cache. When a speculative store writes into the L2 cache, the one or more speculative bits for the cache line are set. These speculative bits may further include bits for each thread to mark the cache line as having a memory block that is to be watched for coherency purposes, i.e. mark bits. If a speculative L2 cache line is evicted (due to capacity, conflict, or coherence), the speculative value is discarded. Any subsequent access to the block (local or external) will fetch the pre-speculative value of the block. The processor architecture is extended with a "lost-speculative-store" bit that is set when a speculative cache line is evicted, and a "watch-lost" bit which is set when mark bits are discarded, i.e. a cache coherency event, capacity limit, priority transition, or the like occurs resulting in a cache line having a mark bit set is evicted and hardware increments a saturation mark counter, as discussed hereafter. There may be a lost-speculative-store and watch-lost bit for each thread of execution on the processor. Thus, if the processor is a simultaneous multithreaded (SMT) processor capable of support 2 simultaneously executing threads, i.e. a SMT2 processor, then there would be 2 sets of lost-speculative-store and watch-lost bits provided. Similarly, if the processor is an SMT4 processor, then there would be 4 sets of these bits.

The atomic release instruction checks both the lost-speculative-store bit and the lost-watch bit for the thread executing the atomic release instruction. If neither bit is set, then the processor atomically makes the speculative values visible to other threads accessing the L2 cache, such as by flash-clearing the speculative bits on the L2 cache lines, which causes the speculative values to be made non-speculative, and the atomic release instruction returns success. If one of the lost-speculative-store bit or the watch-lost bit for the thread is set due to the eviction of a cache line having either a speculative bit set or mark bit set, the processor flash-invalidates all L2 cache lines with speculative bits set, i.e. sets the invalid bits for the speculative cache lines, and returns a failure.

In another illustrative embodiment, a store buffer is provided for each thread. Speculative stores are written directly into this store buffer, but do not obtain memory permissions. If the number of speculative stores overflows this buffer, the "lost-speculative-store" bit is set. The implementation of the atomic release instruction walks the store buffer and attempts to acquire exclusive permissions to all blocks contained in the buffer. If the processor succeeds in obtaining exclusive permissions to all the blocks in the buffer and the lost-speculative-store/watch-lost bits are not set, the processor drains the stores into the L2 cache and the atomic release instruction returns success.

If the processor fails in obtaining exclusive permissions to all the blocks in the buffer, or either the lost-speculative-store or watch-lost bits are set, the processor does not perform any of the stores and the atomic release instruction returns a failure. This store buffer may be integrated into the processor's normal post-retirement store buffer of a processor pipeline. It should be noted that an atomic commit may not be able to obtain exclusive permission to some memory blocks because an atomic commit for another thread has obtained exclusive permissions for them. The atomic commit operations cannot wait for exclusive permissions to be released by other operations because this can lead to a deadlock cycle when two or more operations are waiting for each other to release exclusive permissions for different memory blocks.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to the figures, and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 is an example block diagram of an example data processing system in which aspects of the illustrative embodiments may be implemented. Data processing system 100 is an example of a computer, such as a client computer, server computer, or any other computing device having a processor and a cache memory, in which computer usable code or instructions and hardware implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

With the mechanisms of the illustrative embodiments, the data processing system outlined in FIG. 1 may implement the predicated atomic commit mechanisms of the illustrative embodiments. The one or more processors of the data processing system comprises an instruction set architecture (ISA) that provides new instructions for performing such predicated atomic commit operations and release operations. One or more cache memories of the one or more processor preferably support speculative stores to blocks of memory of the cache lines and provides metadata storage on a per thread basis as discussed in greater detail hereafter for generating "watches" on the memory blocks using mark bits. Furthermore, the processor provides metadata storage for storing bits for indicating when such a watch is lost or when a speculative store has been lost due to eviction of a cache line.

For purposes of the description set forth herein, it will be assumed that the data processing system implementing the predicated atomic commit mechanisms of the illustrative embodiments is a computing device that utilizes a transactional memory architecture. For example, the processor may utilize an L1 and/or L2 cache that implements a transactional memory architecture. While a transactional memory architecture will be used to describe one example implementation of the illustrative embodiments, it should be appreciated that this architecture is only provided as an example and is not intended to state or imply any limitation with regard to the manner by which the illustrative embodiments may be implemented. To the contrary, the illustrative embodiments may be implemented in any computing device where predicated atomic commits are desired without requiring the underlying architecture to support atomic commits on unbounded sets of stores. For example, the atomic commit mechanisms of the illustrative embodiments may be used for checkpointing of execution for the purposes of fault tolerance, thread level speculation, and the like, in many different types of computing devices.

The transactional memory architecture in which the illustrative embodiments may be implemented is one of a software transactional memory, in which the transactional memory is implemented entirely in software on stock hardware, a hardware transactional memory in which the hardware provides architectural support for transactional language constructs, a hybrid transactional memory that utilizes both software and hardware transactional memory elements, or a hardware accelerated software transactional memory (HASTM), such as described in Saha et al. "Architectural Support for Software Transactional Memory," 39$^{th}$ Annual IEEE/ACM International Symposium on Microarchitecture, 2006, which is hereby incorporated by reference. In one illustrative embodiment, used hereafter to describe the improvements made by the implementation of the illustrative embodiments, the transactional memory architecture is a HASTM architecture.

The HASTM architecture, as described in Saha et al., accelerates software transactional memory by providing a filtering mechanism whereby software is able to mark fine-grain blocks of memory using mark bits. The mark bits are metadata that are private per thread and are non-persistent. With these mark bits, software can query if the mark bit has been previously set for a single given block of memory and that there has been no writes to the memory by other threads since the block was marked. Moreover, software can query if there has potentially been any writes by other threads to any of the set of memory blocks the software has marked.

Software sets and queries the mark bits while the hardware may discard a mark bit as long as it records that it has done so. Hardware may record that a mark bit has been discarded by incrementing a saturation mark counter that is part of the architected state of a thread. Software may query whether any of the mark bits have been discarded by reading the mark counter. Mark bits are discarded when a coherency event occurs such that another thread may modify the memory block the mark bit is associated with. Mark bits can also be discarded because of hardware capacity limits or on priority transitions.

The mark bits, in one illustrative embodiment, are implemented by adding a small additional amount of state to the coherency state of cache lines. The mark bits can reside in any level of the cache, such as a first level data cache (L1 cache) or second level data cache (L2 cache). For caches shared by multiple hardware threads, such as in the case of simultaneous multithreading, each thread has its own set of mark bits in the cache, and stores by one thread invalidate other thread's mark bits.

When the processor brings a line of data into the cache, it clears all the mark bits for the new cache line. The mark bits do not persist outside of the cache, i.e. once a cache line leaves the cache or is invalidated, the values of its mark bits disappear. A cache line with any mark bits set is referred to as a marked cache line. The processor increments a mark counter whenever a marked cache line gets evicted or snooped, i.e. when a marked cache line transitions to an invalid state.

In order to support the use of such mark bits, the instruction set architecture of the processor uses six instructions that utilize the mark bits of the cache lines. These six instructions includes a first instruction, the loadSetMark(addr) instruction, that loads a value at memory location addr and sets the mark bit associated with addr. If the address spans across multiple blocks or cache lines, then all the mark bits are set. A loadResetMark(addr) instruction is also provided that loads the value at memory location addr and clears the mark bit associated with addr. Again, if the address spans across multiple blocks or cache lines, then all the mark bits are cleared.

A loadTestMark(addr) instruction is further provided to load the value at memory location addr and set a carry flag to the value of the mark bit. If the address spans across multiple blocks or cache lines, then the logical AND of all the mark bits are put into the carry flag. A resetMarkAll( ) instruction is used to clear all mark bits in the cache and increment the mark counter. A resetMarkCount( ) instruction resets the mark counter and a readMarkCounter( ) instruction reads the mark counter value.

The mark bits in this HASTM architecture allow software to track cache residency of data and thus, whether other processor could have potentially written to a datum between two accesses. By loading a value using the loadTestMark (addr) instruction, software can simultaneously load a value from memory and test the mark bit of the memory address. If the mark bit is set, the software knows not only that it has accessed the address before by using a loadSetMark(addr) instruction, but also that the cache line has not been invalidated since that last access, implying that no other thread has written to that cache line in the interim. The mark counter allows software to monitor whether any of the data it has accessed could have been written by another processor. If the mark counter value is zero, the software knows that none of the cache lines it has accessed using the loadSetMark(addr) instruction have been invalidated, implying that no other processor has written to any of those cache lines since the last time software reset the mark counter.

The mechanisms of the illustrative embodiments utilize these mark bits to set watches for threads, i.e. the mark bits are used to watch for interim accesses to the same cache line by other threads. In the event that a watched cache line is evicted, and the watch is thereby lost, a watch-lost bit in the processor for the particular thread is set to indicate that a watch has been lost. Similarly, if a cache line that is marked as speculative, due to a speculative store to the cache line having been performed, is evicted, a lost-speculative-store bit is set for the particular thread. These bits are then used to determine whether an atomic release instruction succeeds or not.

Figure 2:
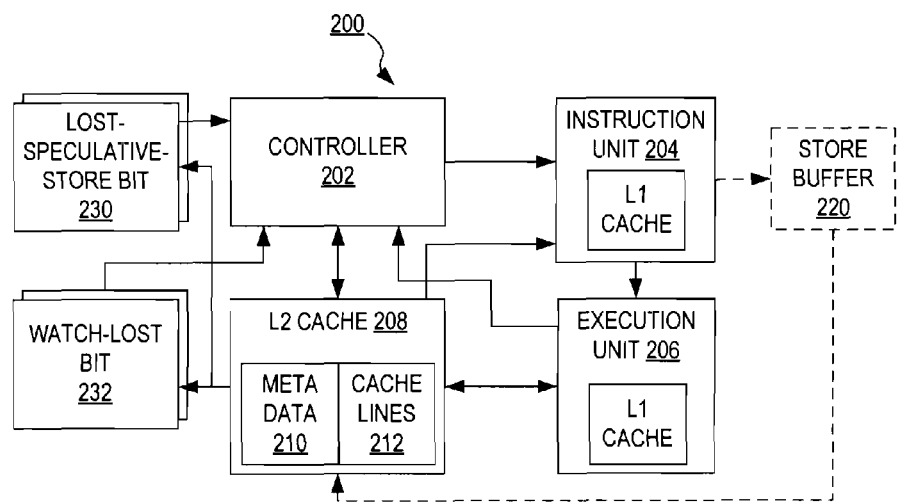
FIG. 2 is an example block diagram of a processor of a data processing system in which aspects of the illustrative embodiments may be implemented.

FIG. 2 is an example diagram of a processor in which example aspects of the illustrative embodiments may be implemented. The processor shown in FIG. 2 may be, for example, the processing unit 106 in FIG. 1, for example. It should be appreciated that FIG. 2 is only an example and is not intended to state or imply any particular configuration limitations with regard to the types of processors that may be used to implement the mechanisms of the illustrative embodiments.

Furthermore, FIG. 2 is a simplified view of a processor for purposes of illustrating the improvements provided by the mechanisms of the illustrative embodiments. Actual processors may comprise many more detailed components in addition to, or in replacement of, those elements shown in FIG. 2 without departing from the spirit and scope of the illustrative embodiments.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As shown in FIG. 2, processor 200 includes controller 202, which controls the flow of instructions and data into and out of processor 200. Controller 202 sends control signals to instruction unit 204, which includes an L1 cache. Instruction unit 204 issues instructions to execution unit 206, which also includes an L1 cache. Execution unit 206 executes the instructions and holds or forwards any resulting data results to, for example, L2 cache 208. In turn, execution unit 206 retrieves data from L2 cache 208 as appropriate. Instruction unit 204 also retrieves instructions from L2 cache 208 when necessary. Controller 202 sends control signals to control storage or retrieval of data from L2 cache 208.

The L1 cache and L2 cache 208 may be implemented using an associative memory, such as a content addressable memory (CAM), for example. Addresses may be supplied to the associative memory in which case every wordline of the associative memory is searched simultaneously to determine if any of the wordlines match the supplied address, i.e. there is a "hit" in the associative memory. If there is a match, a corresponding entry in the L1 or L2 cache 208 is read out and provided to an appropriate unit in the processor 200. Alternatively, the L1 and L2 caches 208 may be implemented using any other non-associative memory type cache known or later developed.

In one illustrative embodiment, the L2 cache 208 is a speculative versioning cache. Speculative versioning caches are cache memory structures that are capable of storing multiple versions of a cache line to enable speculative execution of threads in a multithreading data processing environment. Speculative execution of threads is an optimization technique by which early execution of a thread, whose results may or may not be later needed, is performed so as to achieve greater performance should that thread's results be needed during the execution of the code, i.e. should the thread be transitioned from a speculative state to a non-speculative state in which the results are used. A speculative versioning cache is an extension of a typical cache, where the speculative versioning cache is capable of holding data which is accessible only to the hardware thread that wrote it. For more regarding speculative versioning caches, reference is made to commonly assigned and co-pending U.S. patent application Ser. No. 12/543,688, which is hereby incorporated by reference.

Furthermore, the processor 200, in one illustrative embodiment, implements a transactional memory system in one or more of the L1 and/or L2 cache 208. In one illustrative embodiment, this transactional memory system may be a HASTM system as discussed above. As is generally known in the art, a transactional memory system is one in which transactions that do not overlap are allowed to run uninterrupted in parallel but for purposes of data consistency, portions of the program have to execute atomically, i.e. atomic transactions, whereby transactional memory systems allow programs to read and modify memory locations as a single atomic operation With transactional memory systems, a transaction is a finite sequence of steps or program instructions executed by a single thread. A transaction may execute serially such that the steps or instructions of one transaction do not interleave with the steps or instructions of another. Transactional memory systems provide a mechanism for guaranteeing the atomicity of atomic portions, or atomic transactions, by guaranteeing that these memory accesses appear to an external observer to take effect all at once, i.e. where an atomic section or transaction either commits or aborts. For more information regarding transactional memory systems, reference is made to commonly assigned and co-pending U.S. patent application Ser. No. 12/046,764, now publication 2009/0235254, which is hereby incorporated by reference.

It should be appreciated that while the invention will be described with regard to the L2 cache 208 implementing a speculative versioning cache and a transactional memory system, the illustrative embodiments are not limited to such. To the contrary, the illustrative embodiments may be implemented with any memory mechanism in which the new metadata mechanisms and new instructions described hereafter may be implemented to perform predicated atomic commit operations. It is not necessary for the memory to support speculative versioning or transactional systems in order for the mechanisms of the illustrative embodiments to be operable.

As shown in FIG. 2, entries in the L2 cache 208 comprise cache lines 212 and their associated metadata 210. The metadata 210, in accordance with the illustrative embodiments, comprises mark bits, speculative bits, valid bits, and other metadata, such as thread id metadata or the like, for tracking the state of the corresponding cache lines 212. The mark bits are used to set watches on cache lines 212, the speculative bits are used to mark a cache line as having speculative data, and the valid bits are used to mark bits as valid or invalid. In response to a speculative store being performed to a cache line, the speculative bit for that cache line is set to indicate that the cache line stores speculative data. The mark bits are used in a similar manner to that described in Saha et al., discussed above, to watch a cache line to see if other threads access the cache line, e.g., perform a store operation to the same cache line being watched. The thread id or other metadata may be used to track speculative versions of the cache line in a speculative versioning cache embodiment.

The processor 200 further includes lost-speculative-store bits 230 and watch-lost bits 232 for each thread. The lost-speculative-store bit 230 for a thread is set in response to a speculative cache line, which is being accessed by the thread, having been evicted from the cache. The watch-lost bit 232 for a thread is set in response to a watched cache line, which is being accessed by the thread, being evicted from the cache.

In one illustrative embodiment, speculative store operations performed by the speculative store instructions provided by the mechanisms of the present invention, are performed directly on the L2 cache 208. The speculative store instructions, in addition to storing the data to the cache lines 212, also set the corresponding metadata 210, i.e. speculative bits, mark bits for setting watches, thread id bits, valid bits, etc. Based on the eviction of cache lines in the L2 cache 208, the lost-speculative-store bits 230 and watch-lost bits 232 are set. The controller 202 accesses these bits 230 and 232 in response to executing a predicated atomic commit instruction in accordance with the illustrative embodiments. If either of these bits 230 or 232 for the particular thread are set, then the speculative stores performed since a previous predicated atomic commit instruction are not committed by the thread. If neither of these bits 230 or 232 are set, then the predicated atomic commit is permitted to complete successfully.

In an alternative illustrative embodiment, speculative store operations may be performed to a store buffer 220 rather than directly to the L2 cache 208. Upon a determination that the predicated atomic commit can complete successfully, the store operations in the store buffer 220 are performed on the L2 cache 208, i.e. the store operations are drained from the store buffer 220, such that they are then made visible to other threads accessing the L2 cache 208. The benefit of this alternative illustrative embodiment over the previous illustrative embodiment is that the speculative stores are not exposed to the other threads via the cache prior to a determination that they should be committed. However, with this alternative illustrative embodiment, additional latency may be introduced, as well as the need for additional circuitry, due to the additional store buffer being utilized. Moreover, there may be a separate store buffer for each thread, thereby requiring additional circuitry depending upon the number of simultaneous threads supported by the processor.

Figure 3:
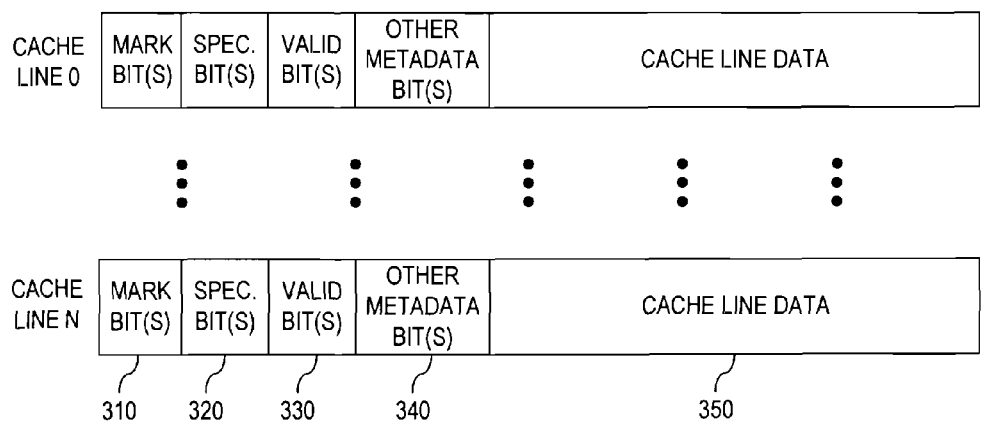
FIG. 3 is an example diagram of a cache line in accordance with one illustrative embodiment.

FIG. 3 is an example diagram of a cache line in accordance with one illustrative embodiment. As shown in FIG. 3, the cache line, which may be a cache line in the L2 cache 208 of FIG. 2, or other cache supporting the use of metadata in accordance with the illustrative embodiments. As shown in FIG. 3, the cache line comprises mark bit(s) 310, speculative bit(s) 320, valid bit 330, other metadata bit(s) 340, and cache line data 350. There may be separate mark bit(s) 310, speculative bit(s) 320, and the like for each thread of execution supported by the processor architecture. For example, if the processor supports two simultaneous threads (SMT2), then there may be two mark bits 310 for setting watches by either or both of the threads. Similarly, there may be two speculative bit(s) 320 to specify which thread has speculatively accessed the cache line. In such a case, it may not be necessary to have separate thread id metadata in order to identify which thread last accessed the cache line since the separate sets of metadata bits implicitly identify the thread that caused the metadata bits to be set. As discussed above, the mark bits 310 and speculative bits 320 are used to identify watched cache lines and speculative cache lines for purposes of determining whether a predicated atomic commit operation should be completed successfully or not and to identify which speculative stores to which speculative cache lines should be committed.

Figure 4:
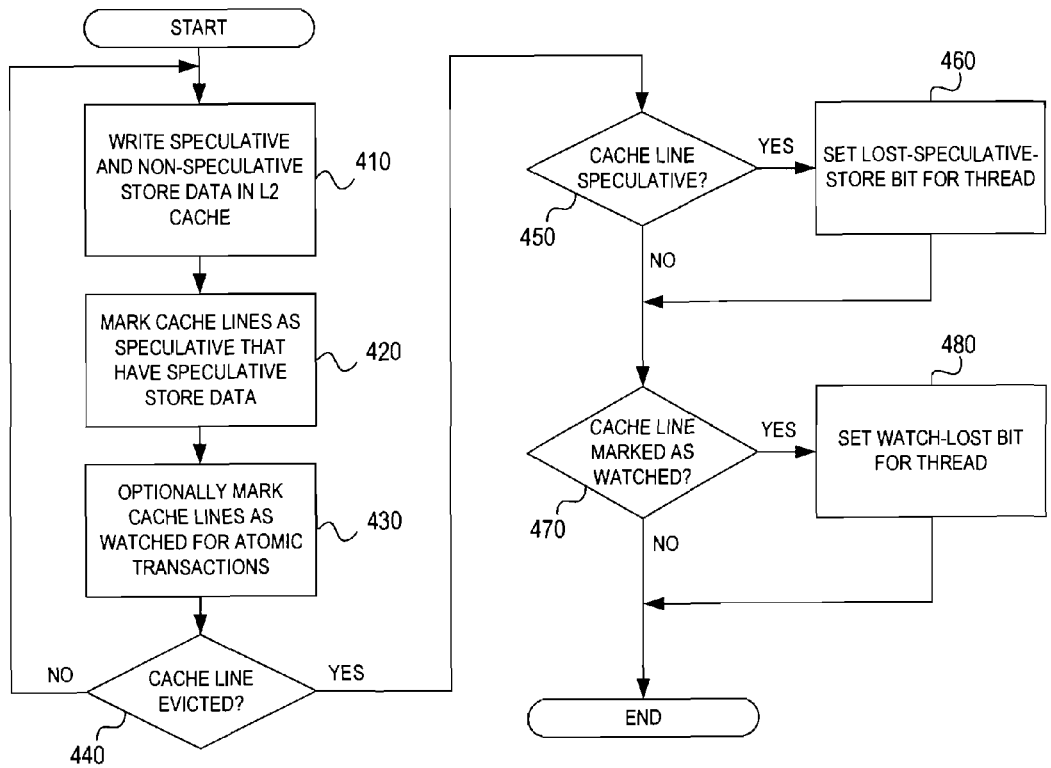
FIG. 4 is an example flowchart outlining an example operation for writing data to a cache memory using a speculative store in accordance with one illustrative embodiment.

FIG. 4 is an example flowchart outlining an example operation for writing data to a cache memory using a speculative store in accordance with one illustrative embodiment. As shown in FIG. 4, the operation starts with speculative and non-speculative store data being written directly to the cache, which in this example is an L2 cache (step 410). The speculative store instructions mark the cache lines to which the store operation is performed as speculative by setting the appropriate speculative bit or bits in the metadata for the cache line (step 420). The speculative store instructions may further mark the cache lines as watched for atomic transactions such that tracking of other threads accessing the same cache line may be performed (step 430).

A determination is made as to whether a cache line is evicted from the cache (step 440). If no cache line has been evicted from the cache, the operation returns to step 410. If a cache line has been evicted from the cache, a determination is made as to whether the cache line is speculative, any of its speculative bits have been set (step 450). If so, the lost-speculative-store bit for the particular thread that performed a speculative store to the cache line is set (step 460). Thereafter, or if the cache line is not speculative, a determination is made as to whether the cache line is marked as watched, i.e. any of its mark bits are set (step 470). If the cache line is marked as a watched cache line, then a corresponding watch-lost bit for the thread that is associated with the mark bit of the cache line is set (step 480). The operation then terminates. While the flowchart terminates at this point for purposes of description, in actuality, the operation may return to step 410 and continue to perform speculative and non-speculative stores to the cache until some terminating event causes the operation to terminate.

It should be noted that the flowchart shown in FIG. 4 is for an embodiment in which speculative stores are performed directly to the cache. In an embodiment in which speculative stores are performed to a speculative store buffer prior to being performed on the cache, the operation of FIG. 4 may be performed on the store buffer. Subsequently, when atomic release operations are performed, as described hereafter with regard to FIG. 6, the store operations in the store buffer may be drained to the cache after a determination that the atomic release operation should be completed successfully.

Figure 5:
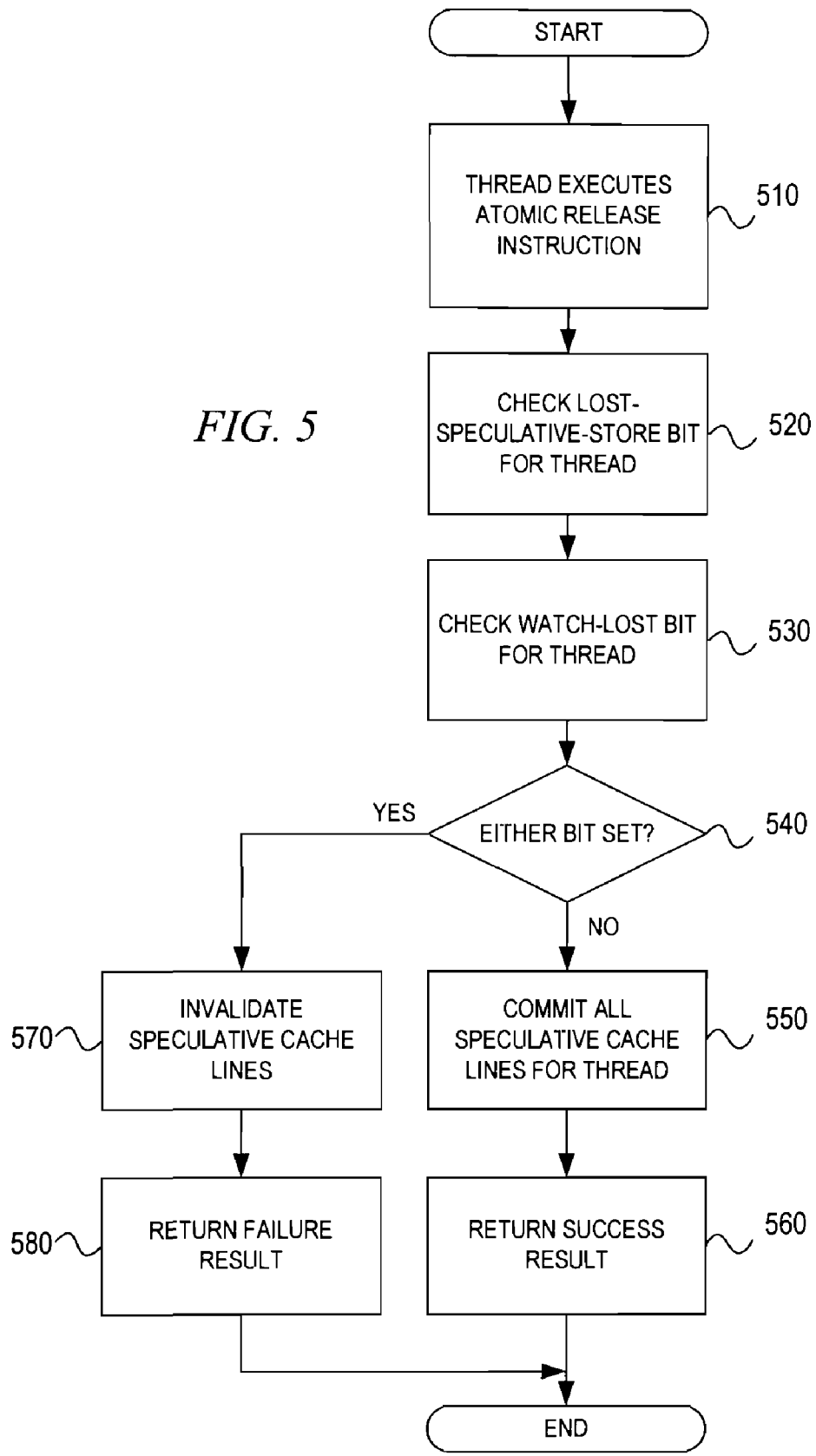
FIG. 5 is an example flowchart outlining an example operation for performing a predicated atomic commit in accordance with one illustrative embodiment in which stores are performed directly to the memory.

FIG. 5 is an example flowchart outlining an example operation for performing a predicated atomic commit in accordance with one illustrative embodiment in which stores are performed directly to the memory. As shown in FIG. 5, the operation starts with a thread executing an atomic release instruction (step 510). The lost-speculative-store bit for the thread is checked (step 520) and the lost-watch bit for the thread is also checked (step 530). A determination is made as to whether either of these bits have been set (step 540). If neither bit has been set, then all speculative cache lines for the thread are committed (step 550) and a success result is returned to the software that spawned the thread (step 560). If either bit is set, then the speculative cache lines for the thread are invalidated (step 570) and a failure result is returned to the software that spawned the thread (step 580). The operation then terminates.

Figure 6:
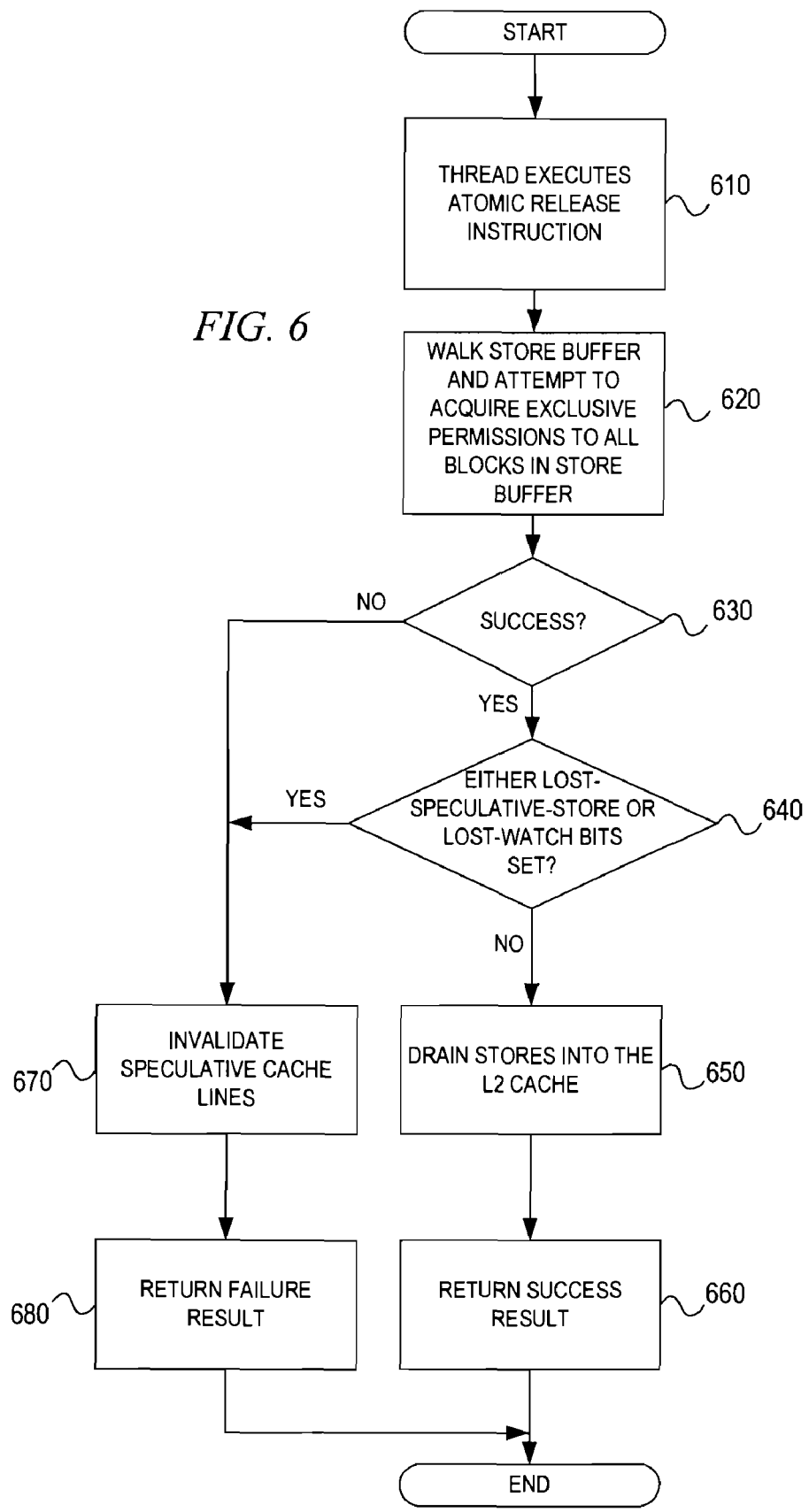
FIG. 6 is an example flowchart outlining an example operation for performing a predicated atomic commit in accordance with one illustrative embodiment in which stores are initially performed to a store buffer.

FIG. 6 is an example flowchart outlining an example operation for performing a predicated atomic commit in accordance with one illustrative embodiment in which stores are initially performed to a store buffer. As shown in FIG. 6, the operation starts with a thread executing an atomic release instruction (step 610). The store buffer is walked and an attempt is made to acquire exclusive permissions to all memory blocks in the store buffer (step 620). That is, for each memory block in the store buffer, an attempt to acquire exclusive permission to the memory block is made and if any of these attempts fails, such as because another atomic commit operation is holding the exclusive permission to the memory block, then all acquired exclusive permissions are released and the operation is considered to have failed.

A determination is made as to whether the attempt to acquire exclusive permissions to all the memory blocks was successful or not (step 630). If so, a determination is made as to whether either lost-speculative-store or lost-watch bits are set for the thread (step 640). If not, then the stores in the store buffer are drained into the cache, e.g., the L2 cache (step 650). And a success result is returned to the software that spawned the thread (step 660).

If either the attempt to acquire the exclusive permissions fails or either of the lost-speculative-store or lost-watch bits are set, then the speculative cache line stores in the store buffer are invalidated (step 670) and the operation returns a failure result to the software that spawned the thread. The operation then terminates.

Figure 8:
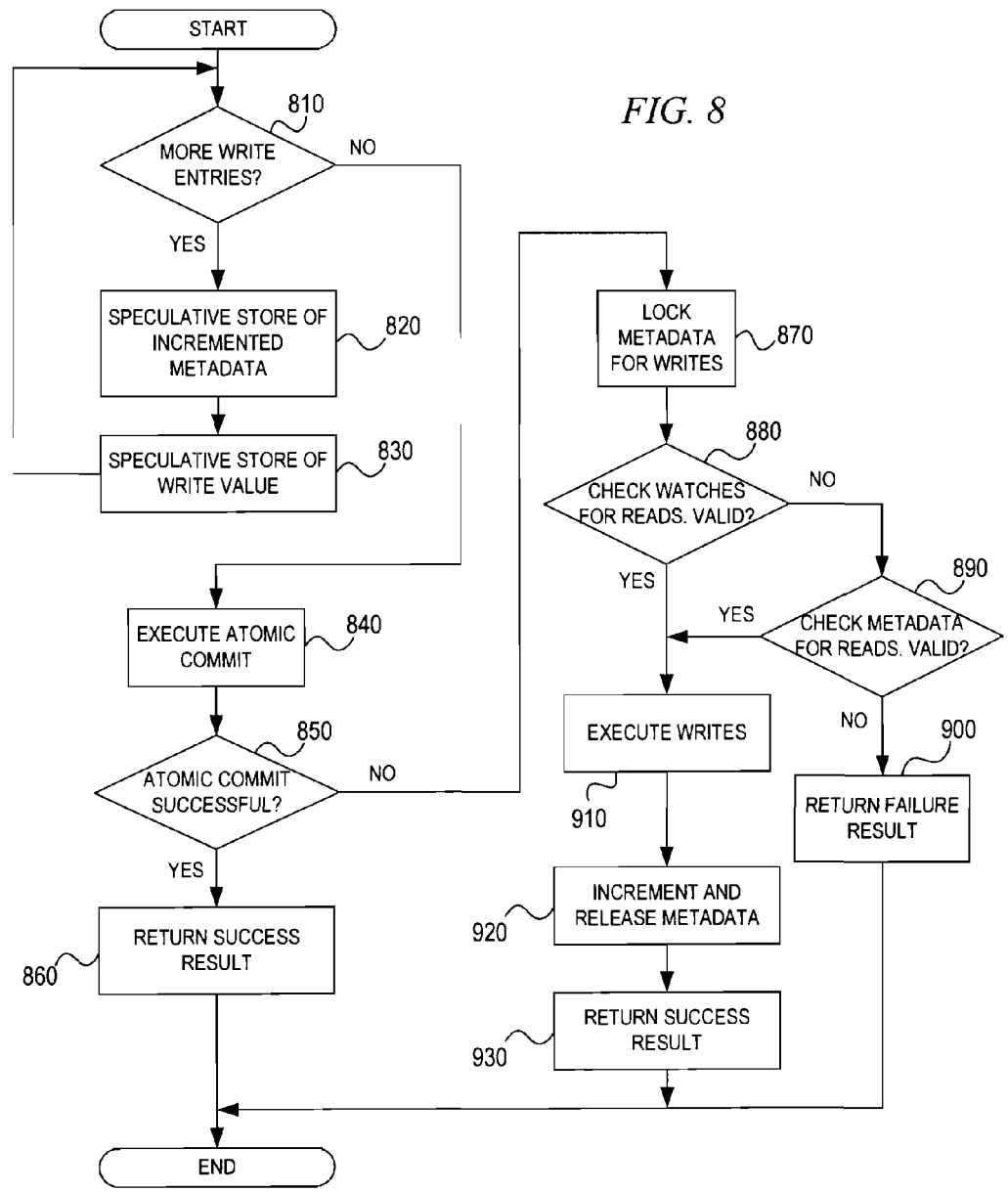
FIG. 8 is a flowchart outlining the operation of the STM algorithm shown in FIG. 7.

FIG. 7 is an example algorithm for implementing the mechanisms of the illustrative embodiments in a software transactional memory (STM) in accordance with one illustrative embodiment. The STM algorithm comprises software instructions that may be executed on one or more processors of one or more data processing systems. FIG. 8 is a flowchart outlining the operation of the STM algorithm shown in FIG. 7.

As shown in FIG. 8, and with continued reference to the algorithm depicted in FIG. 7, a determination is first made as to whether there are more writes (or stores) of entries to the cache line to be performed (step 810). If so, a next speculative write (or store) of incremented metadata is performed (step 820) and a next speculative write (or store) of the write value is performed (step 830). If not, then an atomic commit is executed (step 840) and a determination is made as to whether the atomic commit was successful (step 850). If the atomic commit was successful, the operation returns a success result (step 860) and the operation terminates.

If the atomic commit was not executed successfully, the metadata is locked for writes (step 870) and a check of set watches for reads is performed to determine if the watches are valid (step 880). If the watches are not valid, a check is performed of the metadata for reads to determine if the read set is valid (step 890). If not, a failure result is returned (step 900) and the operation terminates.

If the watches are valid, or if the read set is valid, then the writes (or stores) are executed, i.e. committed (step 910). Thereafter, the metadata is incremented, e.g., the mark counter is incremented, and the metadata is released (step 920). A success result is returned (step 930) and the operation terminates.

Thus, the illustrative embodiments provide a predicated atomic commit mechanism that is predicated on the consistency of watches and whether speculative data has been lost. The illustrative embodiments provide a rich interface to accelerate mechanisms for coarse-grained speculation without requiring the processor architecture to support predicated atomic commit of an unbounded set of stores. With software transactional memory algorithms that typically have to acquire a set of locks to commit all writes for a transaction atomically, the implementation of the illustrative embodiments allow the transactional memory algorithms to avoid acquiring locks when committing stores or writes in common cases since the atomic commit operations are based on metadata that ensures the speculative data can be committed atomically.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a predicated atomic commit of stores to a memory of the data processing system, the method comprising:

executing, by a thread executing on a processor of the data processing system, an atomic release instruction;

determining, by the processor, if a speculative store has been lost, due to an eviction of a memory block to which the speculative store is performed, since a previous atomic release instruction was processed;

in response to the speculative store having been lost, invalidating, by the processor, speculative stores that have been performed since the previous atomic release instruction was processed; and in response to the speculative store not having been lost, committing, by the processor, speculative stores that have been performed since the previous atomic release instruction was processed.

2. The method of claim 1, further comprising determining if a watched memory block of the memory has been written by a different thread than a thread that set a watch on the memory block since a previous atomic release instruction was processed.

3. The method of claim 2, wherein the speculative stores that have been performed to the memory since the previous atomic release instruction was processed are invalidated in response to either the speculative store having been lost or the watched memory block having been written by a different thread, and wherein the speculative stores that have been performed since the previous atomic release instruction was processed are committed in response to neither the speculative store having been lost nor the watched memory block having been written by a different thread.

4. The method of claim 2, wherein determining if a speculative store has been lost since a previous atomic release instruction was processed is performed by determining whether a lost-speculative-store bit for the thread has been set, and wherein determining if a watched memory block of the memory has been written by a different thread is performed by determining if a watch-lost bit for the thread has been set.

5. The method of claim 4, wherein the speculative stores that have been performed since the previous atomic release instruction was processed are invalidated in response to either the lost-speculative-store bit or the watch-lost bit for the thread being set, and wherein the speculative stores that have been performed since the previous atomic release instruction was processed are committed in response to neither the lost-speculative-store bit nor the watch-lost bit for the thread being set.

6. The method of claim 4, wherein the memory is a cache memory coupled to the processor, and wherein the method further comprises:
   performing, by the processor, speculative stores to the cache memory;
   marking, by the processor, cache lines in the cache memory to which the speculative stores are performed as speculative cache lines;
   determining, by the processor, if a speculative cache line is evicted from the cache memory; and
   in response to a speculative cache line being evicted, setting, by the processor, the lost-speculative-store bit for the thread.

7. The method of claim 6, further comprising:
   marking, by the processor, cache lines in the cache memory that are accessed by atomic transactions as watched cache lines;
   determining, by the processor, if a watched cache line is evicted from the cache memory; and
   in response to a watched cache line being evicted, setting, by the processor, the watch-lost bit for the thread.

8. The method of claim 4, further comprising:
   performing, by the processor, speculative stores to a store buffer separate from the memory;
   attempting, by the processor in response to the thread executing the atomic release instruction, to acquire exclusive permissions to all memory blocks referenced by speculative stores in the store buffer; and
   in response to the processor being able to acquire exclusive permissions to all memory blocks referenced by speculative stores in the store buffer, performing the determining if a speculative store has been lost, determining if a watched memory block of the memory has been written, invalidating, and committing operations.

9. The method of claim 8, wherein in response to the processor not being able to acquire exclusive permissions to all memory blocks referenced by speculative stores in the store buffer, invalidating, by the processor, speculative stores that have been performed since the previous atomic release instruction was processed.

10. The method of claim 1, wherein the memory is a transactional memory, and wherein the transactional memory is one of a software transactional memory, a hardware transactional memory, or a hybrid transactional memory.

11. An apparatus for performing a predicated atomic commit of stores to a memory, comprising:
   a processor; and
   a memory coupled to the processor, wherein the processor is configured to:
   execute, by a thread executing on the processor, an atomic release instruction;
   determine if a speculative store has been lost, due to an eviction of a memory block to which the speculative store is performed, since a previous atomic release instruction was processed;
   invalidate, in response to the speculative store having been lost, speculative stores that have been performed since the previous atomic release instruction was processed; and
   commit, in response to the speculative store not having been lost, speculative stores that have been performed since the previous atomic release instruction was processed.

12. The apparatus of claim 11, wherein the processor is further configured to determine if a watched memory block of the memory has been written by a different thread than a thread that set a watch on the memory block since a previous atomic release instruction was processed.

13. The apparatus of claim 12, wherein the speculative stores that have been performed to the memory since the previous atomic release instruction was processed are invalidated in response to either the speculative store having been lost or the watched memory block having been written by a different thread, and wherein the speculative stores that have been performed since the previous atomic release instruction was processed are committed in response to neither the speculative store having been lost nor the watched memory block having been written by a different thread.

14. The apparatus of claim 12, wherein the processor is configured to determine if a speculative store has been lost since a previous atomic release instruction was processed by determining whether a lost-speculative-store bit for the thread has been set, and to determine if a watched memory block of the memory has been written by a different thread by determining if a watch-lost bit for the thread has been set.

15. The apparatus of claim 14, wherein the speculative stores that have been performed since the previous atomic release instruction was processed are invalidated in response to either the lost-speculative-store bit or the watch-lost bit for the thread being set, and wherein the speculative stores that have been performed since the previous atomic release instruction was processed are committed in response to neither the lost-speculative-store bit nor the watch-lost bit for the thread being set.

16. The apparatus of claim 14, wherein the memory is a cache memory, and wherein the wherein the processor is further configured to:
   perform speculative stores to the cache memory;
   mark cache lines in the cache memory to which the speculative stores are performed as speculative cache lines;
   determine if a speculative cache line is evicted from the cache memory; and
   set, in response to a speculative cache line being evicted, the lost-speculative-store bit for the thread.

17. The apparatus of claim 16, wherein the processor is further configured to:
   mark cache lines in the cache memory that are accessed by atomic transactions as watched cache lines;
   determine if a watched cache line is evicted from the cache memory; and
   set, in response to a watched cache line being evicted, the watch-lost bit for the thread.

18. The apparatus of claim 14, wherein the processor is further configured to:
   perform speculative stores to a store buffer separate from the memory;

attempt, in response to the thread executing the atomic release instruction, to acquire exclusive permissions to all memory blocks referenced by speculative stores in the store buffer; and perform, in response to the processor being able to acquire exclusive permissions to all memory blocks referenced by speculative stores in the store buffer, the determining if a speculative store has been lost, determining if a watched memory block of the memory has been written, invalidating, and committing operations.

19. The apparatus of claim 18, wherein the processor is further configured to invalidate, in response to the processor not being able to acquire exclusive permissions to all memory blocks referenced by speculative stores in the store buffer, speculative stores that have been performed since the previous atomic release instruction was processed.

20. A computer program product comprising a computer readable storage medium having a computer readable program stored therein, wherein the computer readable program, when executed on a computing device, causes the computing device to:

execute, by a thread executing on a processor of the computing device, an atomic release instruction;

determine if a speculative store has been lost, due to an eviction of a memory block to which the speculative store is performed, since a previous atomic release instruction was processed;

invalidate, in response to the speculative store having been lost, speculative stores that have been performed since the previous atomic release instruction was processed; and commit, in response to the speculative store not having been lost, speculative stores that have been performed since the previous atomic release instruction was processed.

\* \* \* \* \*